（12） United States Patent
Chuang et al.

(10) Patent No.: US 11,138,859 B2
(45) Date of Patent: Oct. 5, 2021

(54) DETECTION SYSTEM AND DETECTION METHOD

(71) Applicant: HTC Corporation, Taoyuan (TW)

(72) Inventors: Min-Chou Chuang, Taoyuan (TW);
Lun-Kang Lin, Taoyuan (TW);
Hsin-Cheng Yao, Taoyuan (TW);
Chun-Yih Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 16/438,474

(22) Filed: Jun. 12, 2019

(65) Prior Publication Data

US 2019/0378392 A1 Dec. 12, 2019

Related U.S. Application Data

(60) Provisional application No. 62/683,646, filed on Jun. 12, 2018.

(51) Int. Cl.
*G08B 21/10* (2006.01)
*G08B 25/01* (2006.01)
*G01S 17/04* (2020.01)

(52) U.S. Cl.
CPC .............. *G08B 21/10* (2013.01); *G01S 17/04* (2020.01); *G08B 25/016* (2013.01)

(58) Field of Classification Search
CPC ....... G08B 21/10; G08B 25/016; G01S 17/04; B60Q 1/2696
See application file for complete search history.

(56) References Cited

U.S. PATENT DOCUMENTS

| 8,068,051 | B1* | 11/2011 | Osterweil | A61B 5/1117 340/573.1 |
| 2002/0105432 | A1* | 8/2002 | Pederson | G09F 21/04 340/815.45 |
| 2006/0273255 | A1* | 12/2006 | Volkov | G01S 7/024 250/336.1 |
| 2010/0053330 | A1 | 3/2010 | Hellickson et al. | |
| 2010/0300347 | A1 | 12/2010 | Kang et al. | |
| 2011/0298652 | A1* | 12/2011 | Yanagihara | G01S 13/003 342/146 |

(Continued)

FOREIGN PATENT DOCUMENTS

| CN | 2700969 | 5/2005 |
| CN | 202927637 | 5/2013 |
| CN | 104574813 | 4/2015 |

(Continued)

OTHER PUBLICATIONS

"Office Action of Taiwan Counterpart Application", dated Jan. 6, 2020, p. 1-p. 5.

(Continued)

*Primary Examiner* — Mohamed Barakat
(74) *Attorney, Agent, or Firm* — JCIPRNET

(57) ABSTRACT

A detection system and a detection method are provided. The detection system includes at least one illumination device and a host. The illumination device has a radar to obtain spatial information of a position of the illumination device. The host is connected to the at least one illumination device. The host receives the spatial information from the illumination device and transmits a change of the spatial information to an emergency system.

11 Claims, 4 Drawing Sheets

(56) References Cited

U.S. PATENT DOCUMENTS

2016/0203694 A1* 7/2016 Hogasten .......... G08B 21/0476
                                                              348/164

FOREIGN PATENT DOCUMENTS

| CN | 104574813 A | * | 4/2015 |
| CN | 103258400 | | 8/2016 |
| CN | 106175777 | | 12/2016 |
| CN | 106764960 | | 5/2017 |
| CN | 107016822 | | 8/2017 |
| CN | 104756165 | | 9/2017 |
| TW | 201236508 | | 9/2012 |
| TW | 201742031 | | 12/2017 |

OTHER PUBLICATIONS

"Office Action of Taiwan Counterpart Application", dated Jul. 22, 2020, p. 1-p. 5.
"Office Action of China Counterpart Application", dated Jan. 28, 2021, p. 1-p. 11.
"Office Action of China Counterpart Application", dated Jun. 8, 2021, p. 1-p. 10.

* cited by examiner

DETECTION SYSTEM AND DETECTION METHOD

CROSS-REFERENCE TO RELATED APPLICATION

This application claims the priority benefit of U.S. provisional application Ser. No. 62/683,646, filed on Jun. 12, 2018. The entirety of the above-mentioned patent application is hereby incorporated by reference herein and made a part of this specification.

BACKGROUND

Technical Field

The invention relates to a detection system and a detection method, and particularly relates to a detection system and a detection method for detecting an emergency.

Description of Related Art

With assistance of today's advanced communication technology, when an emergency (for example, a natural disaster such as earthquake, typhoon, or other man-made disaster) occurs and many people are trapped in a disaster scene, these people may use wireless communication devices that are carried around them to contact outside world for help. However, at this time, there may be network overload or other unexpected circumstances leading to the failure of successfully contacting the outside world. Moreover, when a current situation of the disaster area is unknown, a rescue organization cannot carry out disaster relief in an effective way.

SUMMARY

The invention is directed to a detection system and a detection method, which are adapted to automatically report emergency situations.

The detection system of the invention includes at least one illumination device and a host. The illumination device has a radar configured to obtain spatial information of a position of the illumination device. The host is connected to the at least one illumination device. The host receives the spatial information from the illumination device and transmits a change of the spatial information to an emergency system.

In an embodiment of the invention, the host includes a decision unit. The host transmits the spatial information to the emergency system through the decision unit according to the change of the spatial information.

In an embodiment of the invention, a number of the at least one illumination device is plural. The host includes a processor. The processor integrates a plurality of spatial information obtained from the radars of the illumination devices.

In an embodiment of the invention, when the host transmits the change of the spatial information to the emergency system, the host simultaneously transmits the spatial information to the emergency system.

In an embodiment of the invention, the detection system further includes a backup power supply for supplying power to the illumination device when utility power is cut off.

In an embodiment of the invention, the radar is a millimeter wave radar.

The detection method of the invention includes following steps. A radar of at least one illumination device is used to obtain spatial information of a position of the at least one illumination device. The spatial information is transmitted to a host. A change of the spatial information is transmitted to an emergency system through the host.

In an embodiment of the invention, the host includes a decision unit. The spatial information is transmitted to the emergency system through the decision unit according to the change of the spatial information.

In an embodiment of the invention, a number of the spatial information transmitted to the host is plural. A processor of the host integrates the spatial information.

In an embodiment of the invention, when the change of the spatial information is transmitted to the emergency system, the spatial information is simultaneously transmitted to the emergency system.

In an embodiment of the invention, the method further includes using a backup power supply to supply power to the illumination device when utility power is cut off.

In an embodiment of the invention, the radar uses millimeter wave to obtain the spatial information.

In an embodiment of the invention, the spatial information is transmitted to the host by using a Bluetooth, Wifi or a ZigBee transmission protocol.

Based on the above description, in the invention, the radar is adapted to obtain the spatial information of the position of the illumination device. The host receives the spatial information and transmits the change of the spatial information to the emergency system to achieve a purpose of timely and rapid transmission of emergency information.

To make the aforementioned more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
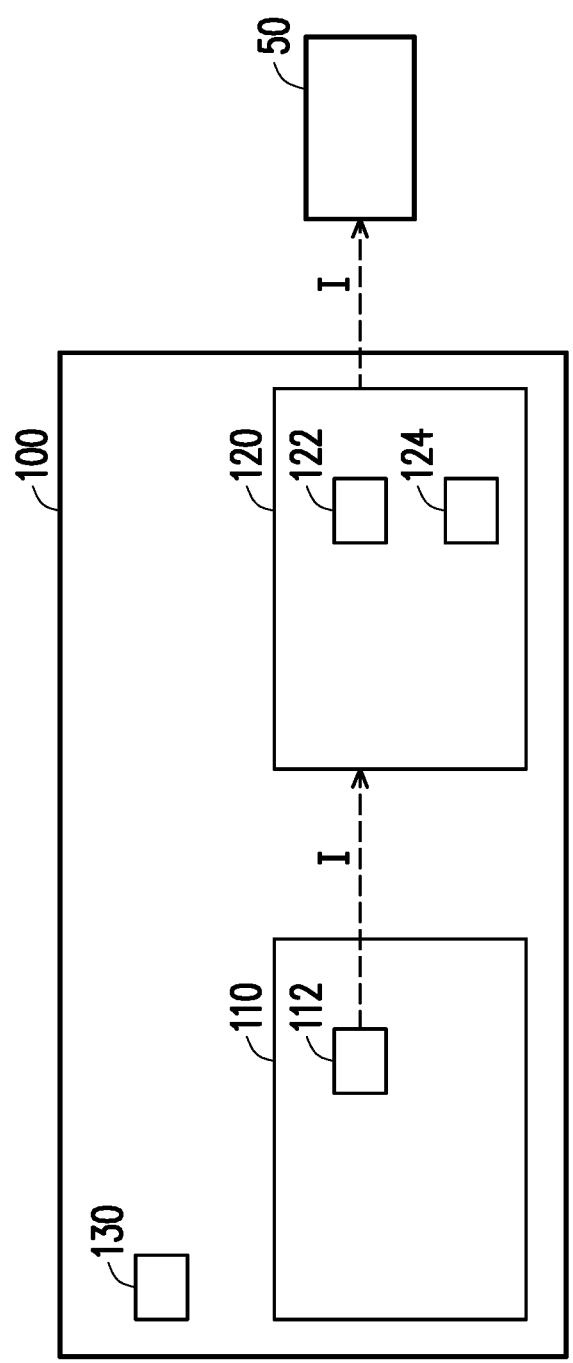
FIG. 1A is a schematic diagram of a component relationship of a detection system according to an embodiment of the invention.
Figure 1B:
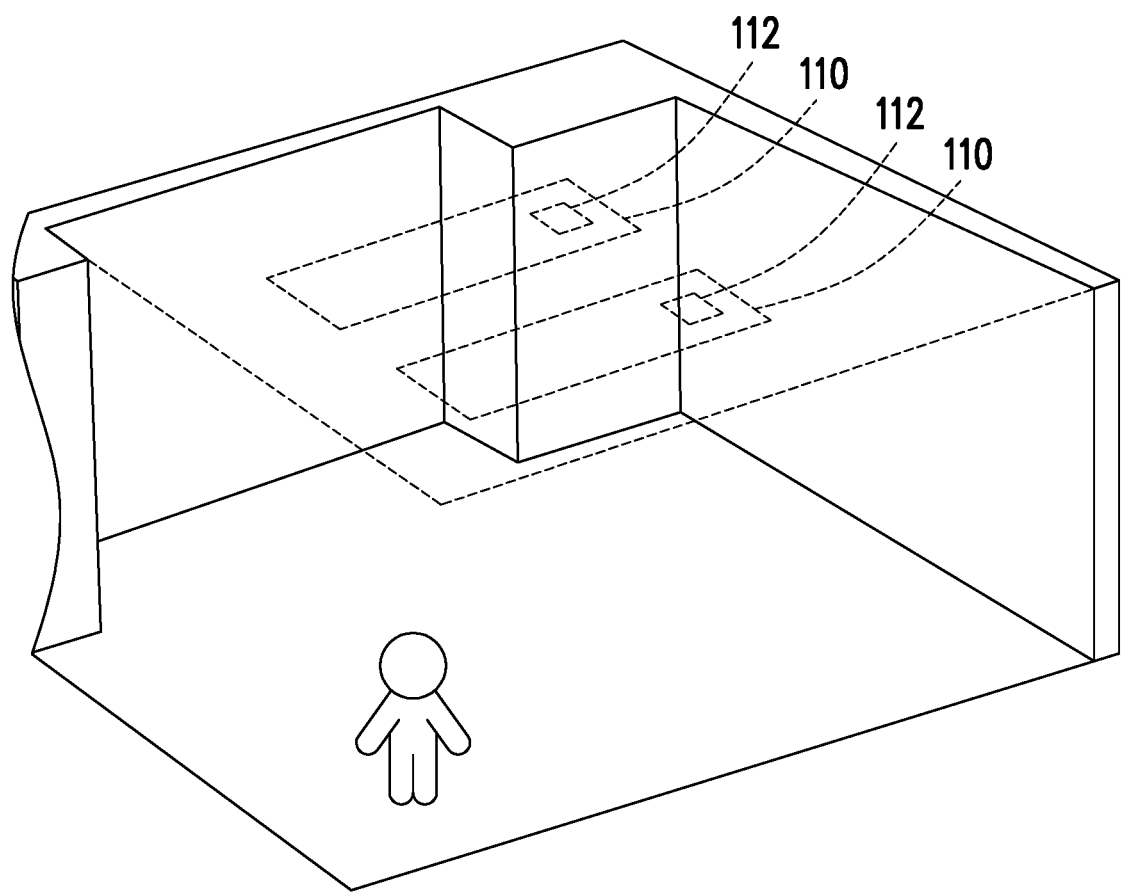
FIG. 1B is a schematic diagram of an installation environment of illumination devices of the detection system of FIG. 1A.

FIG. 1A is a schematic diagram of a component relationship of a detection system according to an embodiment of the invention. FIG. 1B is a schematic diagram of an installation environment of illumination devices of the detection system of FIG. 1A. It should be noted that for clarity's sake, FIG. 1B only schematically illustrates the illumination devices 110 in dotted lines. Referring to FIG. 1A and FIG. 1B, the detection system 100 includes at least one illumination device 110 and a host 120 connected to the at least one illumination device 110. The host 120 may be a server, an edge smart server, a wired host or a cloud host, or a host capable of receiving wireless signals. The host 120 may be connected to a plurality of illumination devices 110 in a wired manner or receive wireless signals of the plurality of illumination devices 110. The host 120 may be connected to a Central Emergency Operation Center (CEOC) or regional emergency rescue units such as police stations, fire stations, hospitals, etc., in a wired or wireless manner, so as to transmit status information of the scene near the detection system 100 to the emergency units. In the embodiment, each of the illumination devices 110 has a radar 112, which is configured to obtain spatial information (I) of a position of the illumination device 110. As shown in FIG. 1A, the illumination device 110 is, for example, located in a building, and the illumination device 110 is, for example, a ceiling lamp mounted on a ceiling, but the type and installation position of the illumination device 110 are not limited by the invention. The illumination device 110 may also be a street lamp, a desk lamp, a red street lamp, a fluorescent lamp, an xenon lamp, a wall lamp, a standing lamp, a table lamp, a ceiling lamp, a crystal pendant lamp, a room lamp, a floor lamp, a night light, a security lamp, a power failure lamp, an exit lamp, a fire indicator lamp, a projection lamp, a moisture proof lamp, a waterproof lamp, an explosion-proof lamp, a light projecting lamp, a moisture-proof lamp, an explosion-proof lamp, an elevated lamp, a germicidal lamp, a mosquito trap lamp, a refuge lamp, a work lamp, a drawing lamp, a dry lamp, a heat preservation lamp, a film lamp, a freezer lamp, a warning lamp, a mercury lamp, a garden lamp, a footpath lamp, a lawn lamp, a pool lamp, a stage lamp, a spotlight or other light sources. The host 120 receives the spatial information (I) from the illumination device 110, and the host 120 transmits a change of the spatial information (I) to an emergency system 50. The change of the spatial information (I) may be a movement of an object within a building or a deformation of the building itself (such as a wall or a beam). The object may include a person, part of a human limb, part of a human organ, an animal, or any movable object. The host 120 includes a decision unit 122. When the decision unit 122 determines that an emergency situation exists according to the change of the spatial information (I), the host 120 automatically transmits the spatial information (I) to the emergency system 50. The emergency system 50 is, for example, the aforementioned CEOC or regional emergency rescue unit, such that the emergency rescue unit obtains status information of the scene near the detection system 100.

The radar 112 of the illumination device 110 may be configured with at least one antenna for receiving radar signals. The antenna may be directional for receiving radar signals of a particular direction. Namely, by configuring the antennas at different positions of the illumination device 110 or facing different directions, the spatial information (I) around the illumination device 110 is obtained. After the host 120 receives the spatial information (I), the decision unit 122 may decide whether the emergency situation exists, so as to immediately transmit information related to the emergency situation to the emergency system 50, which avails rapid notification to achieve a purpose of timely and rapid transmission of emergency information.

Figure 2:
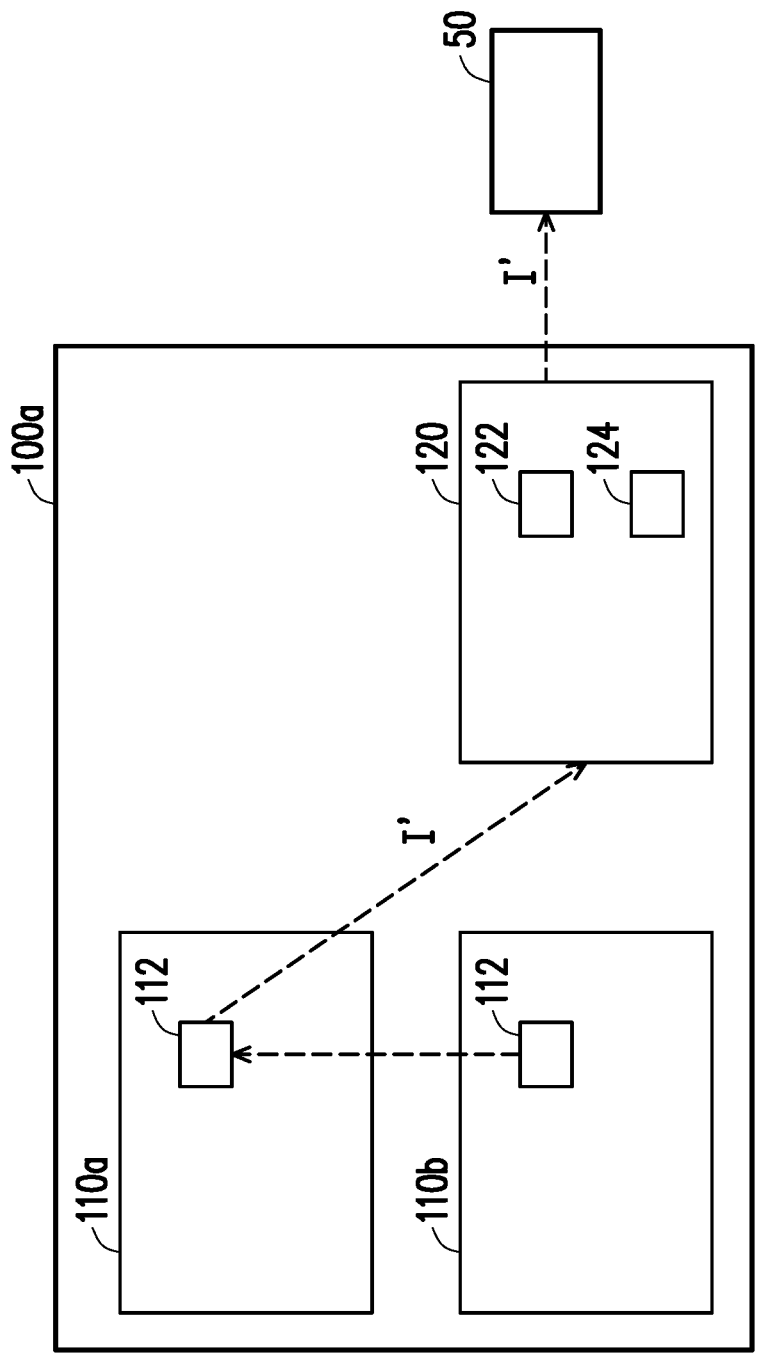
FIG. 2 is a schematic diagram of a component relationship of a detection system according to another embodiment of the invention.

The spatial information may include relative positions of the illumination devices obtained through radar signals emitted by different illumination devices. FIG. 2 is a schematic diagram of a component relationship of a detection system according to another embodiment of the invention. The detection system 100a of FIG. 2 is similar to the detection system 100 of FIG. 1A, but the detection system 100a obtains relative positions of the illumination devices by using radar signals emitted by the different illumination devices. As shown in FIG. 2, the illumination device 110a uses the antenna of the radar 112 to receive the radar signal of the illumination device 110b. The illumination device 110a may obtain spatial information (I') according to a signal intensity, a frequency or a change in time of the received radar signal of the illumination device 110b. The spatial information (I') may be relative. For example, when an intensity of the radar signal of the illumination device 110b received by the illumination device 110a is lower than an intensity of a reflection signal of the radar signal of the illumination device 110b received by the illumination device 110a, it is determined that a configuration position of the illumination device 110b is higher than that of the illumination device 110a. The host 120 may determine the movement of people and objects in the building or the deformation of the building itself (such as a wall or a beam) through a relative position between the illumination devices 110a and 110b. Similarly, after the host 120 receives the spatial information (I'), the decision unit 122 may determine whether the change of the spatial information exists (i.e. determine existence of the emergency situation), so as to immediately transmit information related to the emergency situation to the emergency system 50, which avails rapid notification to achieve the purpose of timely and rapid transmission of emergency information.

Moreover, the host 120 may be composed of a plurality of servers arranged on different floors, and these servers may be connected to a plurality of illumination devices of each of the floors in a wired or wireless manner. Theses illumination devices determine the spatial information of the floor where the illumination devices are located through signals sent by the servers, and through the spatial information of the floor, the host 120 may determine movement of people and objects on the floor within the building or the deformation of the walls or beams in the floor. The server or the host 120 may be movable, and the host 120 may include a GPS receiver, and may transmit received GPS position data to the illumination devices connected to the host 120, so that the illumination devices may store the GPS position data. Namely, the spatial information may include the GPS position data. When an emergency occurs and the illumination device detects a large-scale deformation, the spatial information including position data may be transmitted to the host 120 or the servers.

The spatial information may be different types of illumination device information. Taking a traffic light or other signal light as an example, it has a certain height requirement in terms of setup, and data detected by the traffic light by using a radar signal includes road condition data. When the traffic light is connected to the host 120, the host 120 may use the road condition data to determine a condition of the disaster-affected road. Alternatively, taking a mercury lamp used in an office building as an example, it has a certain height requirement in terms of setup, and data detected by the mercury lamp using the radar signal includes office building floor information. When the mercury lamp is connected to the host 120, the host 120 may use the office building floor information to determine a condition of the office building. Moreover, since the illumination device is necessary in most places, it is relatively easy to complete the extensive deployment of the detection system of the embodiment. A connection port of the illumination device may adopt a specification compatible with the existing illumination device to further reduce the cost of deploying the detection system of the embodiment.

Figure 3:
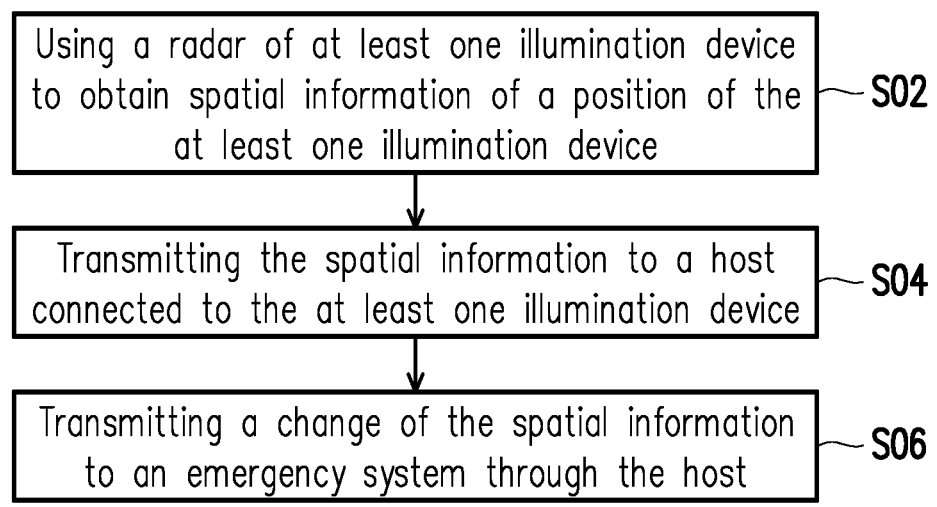
FIG. 3 is a flowchart illustrating a detection method corresponding to the detection system of FIG. 1A.

A detection method of the invention is described below with reference of the embodiment of FIG. 1A. FIG. 3 is a flowchart illustrating a detection method corresponding to the detection system of FIG. 1A. Referring to FIG. 1A and FIG. 3, first, the radar 112 of the illumination device 110 is applied to obtain the spatial information (I) of a position of the illumination device 110 (step S02). Then, the spatial information (I) is transmitted to the host 120 connected to the illumination device 110 (step S04). Finally, a change of the spatial information (I) is transmitted to the emergency system 50 through the host 120 (step S06).

For example, the number of the illumination device 110 may be plural. The host 120 further includes a processor 124, which is used for integrating a plurality of spatial information (I) obtained by a plurality of radars 112 of the illumination devices 110. It should be noted that for simplicity's sake, only one illumination device 110 is schematically illustrated in FIG. 1A. Moreover, only one illumination device 110 is described in following contents.

The decision unit 122 of the host 120 may be configured with an artificial intelligent system to determine an extent of the emergency and transmit the emergency message to the emergency system 50. Moreover, the artificial intelligent system may perform data analysis according to daily information collected by the radar 112 in order to more accurately determine that the spatial information (I) needs to be handled as an emergency. The illumination device 110 may also include an artificial intelligent module. The artificial intelligent module includes a trained module for determining an environment in which the illumination device is placed. The illumination device has a plurality of detectors or sensors connected to the artificial intelligent module. The artificial intelligent module determines an environment condition according to signals generated by the detectors. The spatial information (I) may include the environment condition determined by the artificial intelligent module. For example, the detectors take a turning on/off time or a frequency of the illumination device as the data input to the artificial intelligent module, and the artificial intelligence module determines a setting environment of the illumination device according to the turning on/off time of the illumination device. The sensors may be resistive sensors, capacitive sensors, inductive sensors, piezoelectric sensors, thermoelectric sensors, impedance sensors, magnetoelectric sensors, piezoelectric sensors, photoelectric sensors, resonant sensors, Hall sensors, ultrasonic sensors, isotope sensors, electrochemical sensors, microwave sensors, ultrasonic wave sensors, temperature sensors, humidity sensors, gas sensors, gas alarms, pressure sensors, acceleration sensors, ultraviolet sensors, magnetic sensors, magnetoresistive sensors, image sensors, electricity sensors, displacement sensors, pressure sensors, temperature and humidity sensors, PH sensors, flow rate sensors, liquid level sensors, ultrasonic sensors, water immersion sensors, illuminance sensors, differential pressure transmitters, weighing sensors, ranging sensors, etc. The sensors may start detecting environment conditions or life signals after the illumination device 110 detect a large-scale environmental deformation.

In the embodiment, the detection system 100 further includes a backup power supply 130 for supplying power to the illumination device 110 when utility power is cut off. Namely, when power failure occurs due to an emergency, since the detection system 100 is equipped with the backup power supply 130, it may continue to provide the spatial information (I) to the rescue units even if there is no external power supply or the external power supply is unstable, thus avoiding the problem that the spatial information (I) cannot be transmitted to the emergency system 50. Moreover, the illumination device 110 may also continuously provide an illumination function, which will help search and rescue.

Further, in an embodiment, the radar 112 is, for example, a millimeter wave radar. Namely, the radar 112 uses millimeter wave to obtain the spatial information (I), but the invention is not limited thereto. The radar 112 may also be a Doppler radar or a radar having a pulse-Doppler signal processing system. Different wavelengths have different penetration capabilities, so that by using different wavelengths, amplitudes or phases, the radar 112 may filter to detect different objects (such as fire, smoke or water) and collect the detected information to serve as a basis for subsequent emergency determination.

In the embodiment, when transmitting the change of the spatial information (I) to the emergency system 50, the host 120 simultaneously transmits the spatial information (I) to the emergency system 50. In this way, the emergency system 50 may obtain the related information of the location where the current emergency occurs before the rescue, so as to more effectively carry out emergency rescue and disaster relief.

In the embodiment, the spatial information (I) is transmitted to the host 120 by using Bluetooth, Wifi, a low-speed and short-distance wireless network protocol or a ZigBee transmission protocol. Certainly, transmission of the spatial information (I) may be implemented through other transmission system, which is not limited by the invention. The spatial information (I) may also be mutually transmitted though the illumination devices, thereby transmitting the spatial information (I) of the connected illumination devices to the host 120.

In summary, the spatial information around the illumination device may be obtained by using the radar configured on the illumination device, and after the host receives the spatial information, the decision unit may determine whether there is an emergency situation, so as to immediately inform the emergency situation to preset contact units, which avails rapid notification to achieve the purpose of timely and rapid transmission of emergency information. Moreover, in the process of notifying the preset contact units, the host simultaneously transmits the information of the location of the emergency situation, thereby improving the rescue efficiency.

It will be apparent to those skilled in the art that various modifications and variations can be made to the disclosed embodiments without departing from the scope or spirit of the invention. In view of the foregoing, it is intended that the invention covers modifications and variations provided they fall within the scope of the following claims and their equivalents.

What is claimed is:

1. A detection system, adapted to automatically report emergency situations including a disaster, the detection system comprising:

at least one first illumination device, located in a building, and having a first radar;

at least one second illumination device, located in the building, and having a second radar, wherein the first illumination device receives a radar signal of the second illumination device by the first radar, and the first illumination device obtains spatial information according to a signal intensity, a frequency or a change in time of the received radar signal of the second illumination device, and the spatial information includes a relative position between the first and second illumination devices; and a host, connected to the at least one first illumination device and the at least one second illumination device, and the host receiving the spatial information from the first illumination device and transmitting a change of the spatial information to an emergency system, wherein the change of the spatial information includes a movement of an object within the building and a deformation of the building, and the host determines the movement of the object within the building and the deformation of the building through the relative position between the first and second illumination devices, wherein when the host transmits the change of the spatial information to the emergency system, the host simultaneously transmits the spatial information including location where the disaster occurs to the emergency system.

2. The detection system as claimed in claim 1, wherein the host comprises a decision unit, and the host transmits the spatial information to the emergency system through the decision unit according to the change of the spatial information.

3. The detection system as claimed in claim 1, wherein a number of the at least one first illumination device is plural, the host comprises a processor, and the processor integrates a plurality of spatial information obtained from the first radars of the first illumination devices.

4. The detection system as claimed in claim 1, further comprising a backup power supply for supplying power to the at least one first illumination device and the at least one second illumination device when utility power is cut off.

5. The detection system as claimed in claim 1, wherein the first and second radars are millimeter wave radars.

6. A detection method, adapted to automatically report emergency situations including a disaster, the detection method comprising:

using a radar of at least one first illumination device to receive a radar signal of at least one second illumination device, wherein the first illumination device and the second illumination device are located in a building;

obtaining a spatial information by the first illumination device according to a signal intensity, a frequency or a change in time of the received radar signal of the second illumination device, wherein the spatial information includes a relative position between the first and second illumination devices;

transmitting the spatial information to a host connected to the at least one first illumination device and the at least one second illumination device; and transmitting a change of the spatial information to an emergency system through the host, wherein the change of the spatial information includes a movement of an object within the building and a deformation of the building, the host determines the movement of the object within the building and the deformation of the building through the relative position between the first and second illumination devices, and when the change of the spatial information is transmitted to the emergency system, the spatial information including location where the disaster occurs is simultaneously transmitted to the emergency system.

7. The detection method as claimed in claim 6, wherein the host comprises a decision unit, and the spatial information is transmitted to the emergency system through the decision unit according to the change of the spatial information.

8. The detection method as claimed in claim 6, wherein a number of the spatial information transmitted to the host is plural, and a processor of the host integrates the spatial information.

9. The detection method as claimed in claim 6, further comprising: using a backup power supply to supply power to the at least one first illumination device and the at least one second illumination device when utility power is cut off.

10. The detection method as claimed in claim 6, wherein the radar uses millimeter wave to obtain the spatial information.

11. The detection method as claimed in claim 6, wherein the spatial information is transmitted to the host by using Bluetooth, Wifi or a ZigBee transmission protocol.

* * * * *